June 9, 1959 D. RICHMAN 2,890,270

FREQUENCY-DIFFERENCE DETECTOR SYSTEM

Filed May 21, 1954 4 Sheets-Sheet 1

June 9, 1959 D. RICHMAN 2,890,270

FREQUENCY-DIFFERENCE DETECTOR SYSTEM

Filed May 21, 1954

4 Sheets-Sheet 4

United States Patent Office 2,890,270
Patented June 9, 1959

2,890,270

FREQUENCY-DIFFERENCE DETECTOR SYSTEM

Donald Richman, Fresh Meadows, N.Y., assignor to Hazeltine Research, Inc., Chicago, Ill., a corporation of Illinois

Application May 21, 1954, Serial No. 431,383

14 Claims. (Cl. 178—5.4)

GENERAL

Figure 1:
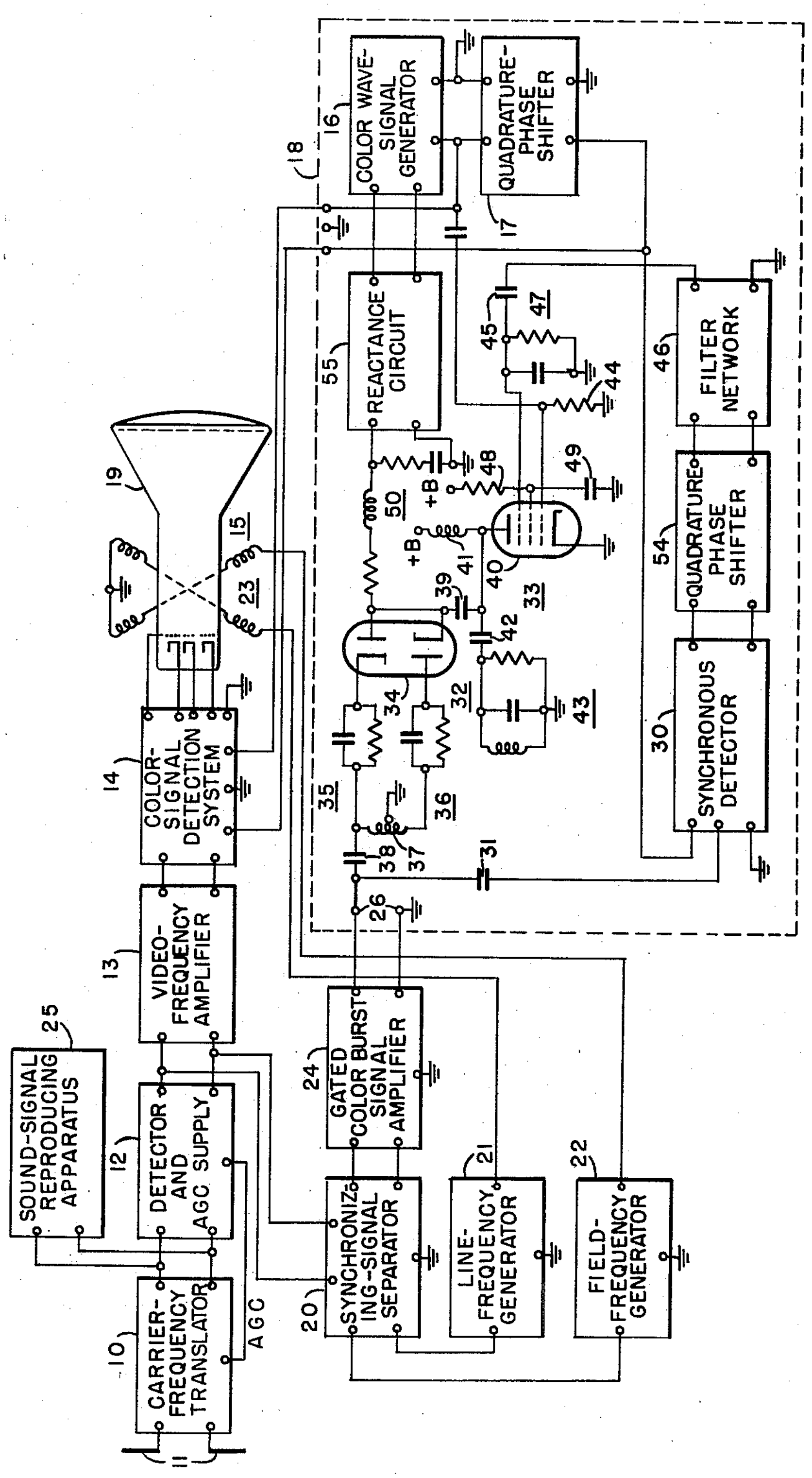

The present invention is directed to frequency-difference detector systems for developing a signal representative of the difference in the frequencies of signals applied thereto. Although the invention is subject to a wide variety of applications, it has particular utilization in a synchronizing system for the color-signal deriving apparatus of a color-television receiver utilizing an NTSC color-television signal and will be described in that environment.

In general, in television systems, in order to obtain a satisfactory image on the screen of the cathode-ray image-reproducing tube at the television receiver, it is important that accurate synchronism be maintained at all times and under the most extreme conditions between some of the processes occurring at the receiver and the synchronizing components included in the received television signal. In an NTSC type of color-television system, such as recently standardized by the Federal Communications Commission, this received television signal includes a subcarrier wave signal modulated at different phases by signals individually representative of the colors of an image. If the received signal is such an NTSC signal, the synchronizing components thereof comprise not ony signals for controlling the horizontal and vertical tracing of the image on the image screen of the cathode-ray tube, but also a synchronizing signal for controlling the operation of the color-signal deriving apparatus at the receiver so that it is in proper time relation with corresponding modulation apparatus at the transmitter. The problems of effectively deriving the synchronizing signals under a wide range of operating conditions have been thoroughly considered in applicant's copending application Serial No. 328,917, entitled "Synchronizing System," filed December 31, 1952, now Patent No. 2,848,537, issued Aug. 19, 1958. In the copending application, it is pointed out that it is desirable to utilize automatic-phase-control (APC) systems for controlling the synchronization of units at the receiver with corresponding units at the transmitter. However, APC systems having a desirable degree of stability may have relatively narrow pull-in ranges and, thus, if the difference in the frequencies of the synchronizing components and the locally generated signals is excessive, synchronization may not be readily effected. Such differences can occur when a receiver is first turned on, when it is switched from one receiving channel to another, when the signal-to-noise ratio of the received signal is low, or for a number of other reasons. Thus, as explained in the copending application, it is desirable to utilize a two-mode system of synchronization comprising an APC system for maintaining synchronization and an auxiliary frequency-control system for effecting such synchronization when the differences in the frequency of the synchronizing signals and the locally generated signals are beyond the control range of the APC system. The frequency-control system comprises a frequency-difference detector which determines that a frequency difference exists between the locally generated signals and the synchronizing signal and then develops an adequate control singal to reduce such frequency difference until it is at least within the pull-in range of the APC system.

Conventional frequency-difference detector systems are normally quite complex and are, therefore, not readily usable as a frequency-difference detector for the above-described purpose. Additionally, known conventional systems are not as immune to noise as may be desired and do not respond in a linear manner over the frequency ranges desirable in a frequency-difference detector of the type described above. Additionally, in order to minimize the expense of frequency-difference detectors employed in cooperation with APC systems, it would be desirable that as many as possible of the conventional units in such systems be employed not only as APC system components but also as frequency-difference detector components. However, conventional frequency-difference detectors do not lend themselves to such cooperative arrangement.

It is, therefore, an object of the present invention to provide a new and improved frequency-difference detector system which avoids the deficiencies and limitations of prior such detector systems.

It is also an object of the present invention to provide a new and improved frequency-difference detector system which has essentially a linear response over a wide range of frequency differences.

It is additionally an object of the present invention to provide a new and improved frequency-difference detector system which is relatively simple in construction.

It is also an additional object of the present invention to provide a new and improved frequency-difference detector system which may readily be combined with the APC system of a television receiver to provide an improved synchronizing system.

In accordance with the present invention, a frequency-difference detector system comprises means for supplying a reference signal and first and second controlled signals which have substantially identical frequencies but are in quadrature phase with respect to each other, the identical frequencies tending to differ from that of the reference signal. The detector system also includes a first synchronous detector system coupled to the supply means and responsive to the reference and the first of the controlled signals for developing a resultant signal. Additionally, the frequency-difference detector system includes a combined synchronous detector and modulator system coupled to the supply means and the first synchronous detector and responsive to the reference signal, the second of the controlled signals, and the resultant signal for modulating one of the pair of signals comprising the reference and the second of the controlled signals with the resultant signal to develop a modulated signal and for heterodyning the modulated signal and the other of the pair of signals to develop an output signal representative of the difference in frequency of the reference and the controlled signals. Finally, the frequency-difference detector system includes means for applying the output signal to a utilizing means.

For a better understanding of the present invention, together with other and further objects thereof, reference is had to the following description taken in connection with the accompanying drawings, and its scope will be pointed out in the appended claims.

Figure 2:
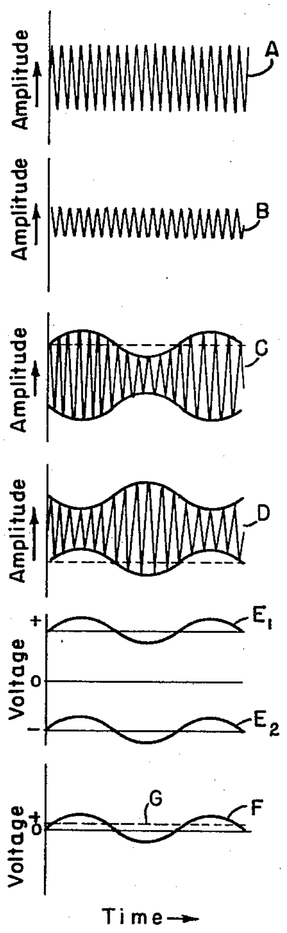
Figure 3:
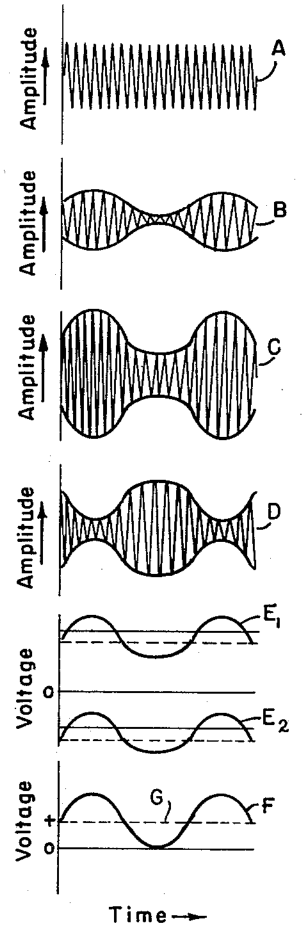
Figure 4:
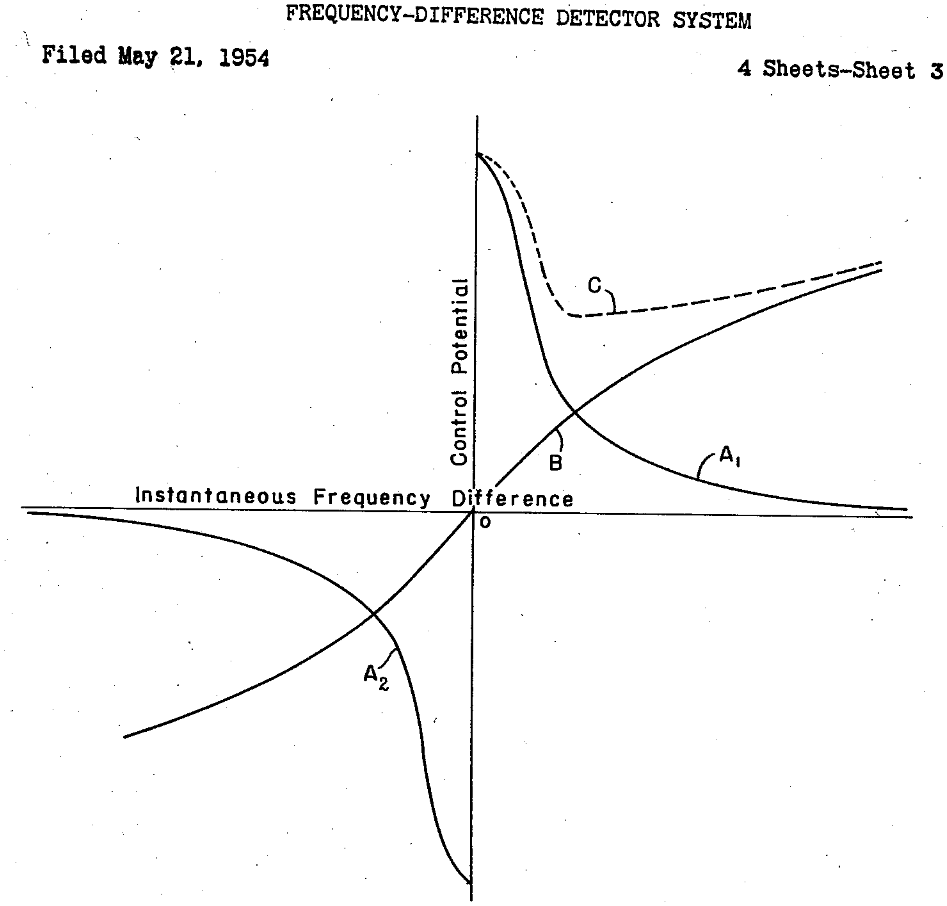
Figure 5:
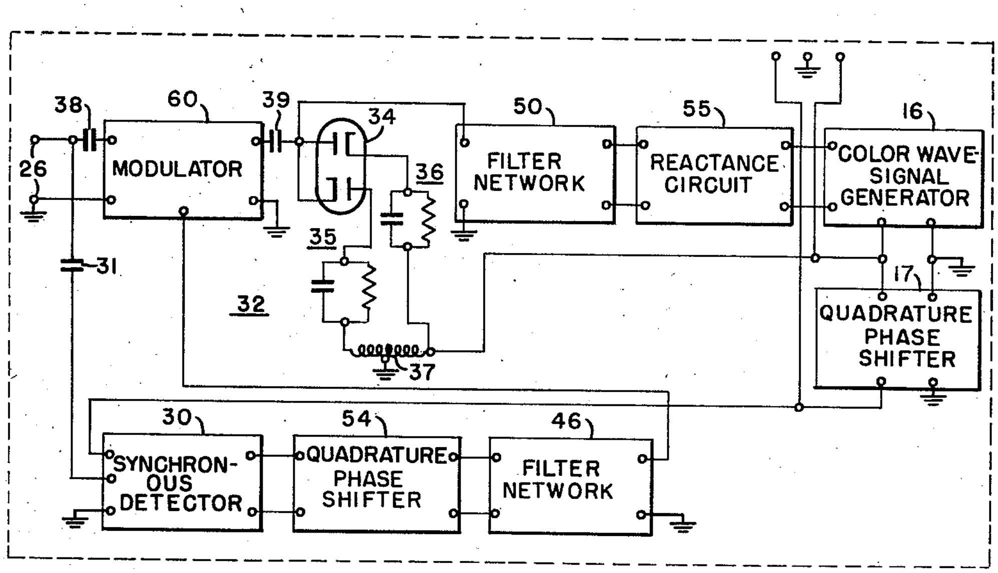
Figure 6:
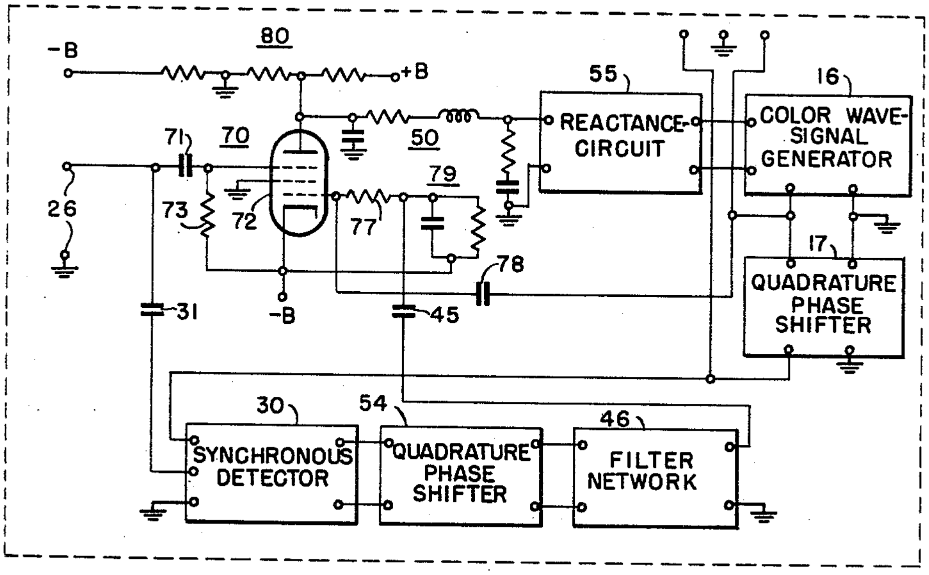

Referring to the drawings:

Fig. 1 represents a color-television receiver including one embodiment of a frequency-difference detector system in accordance with the present invention;

Figs. 2, 3, and 4 are groups of curves useful in explaining the operation of the frequency-difference detector system of Fig. 1;

Fig. 5 represents a modified form of the frequency-difference detector system of Fig. 1, and Fig. 6 represents another modified form of the frequency-difference detector system of Fig. 1.

*General description of receiver of Fig. 1*

Referring now to Fig. 1 of the drawings, there is represented a color-television receiver of the superheterodyne type such as may be used in a color-television system of the type previously discussed herein. More complete details of such a receiver are presented in an article at pages 334–343, inclusive, of the January 1954 issue of the Proceedings of the I.R.E. The receiver of Fig. 1 includes a carrier-frequency translator 10 having an input circuit coupled to an antenna system 11. It will be understood that the unit 10 may include in a conventional manner one or more stages of wave-signal amplification, an oscillator-modulator, and one or more stages of intermediate-frequency amplification, if such are desired. There are coupled to the output circuit of the unit 10 in cascade, in the order named, a detector and automatic-gain-control (AGC) supply 12, a video-frequency amplifier 13 of one or more stages, a color-signal detection system 14, and an image-reproducing device 15 of the cathode-ray tube type. Different input circuits of the detection system 14 are individually coupled directly and through a quadrature-phase shifter 17 to the output circuit of a color wave-signal generator 16. The units 16 and 17 are components of a frequency-difference detector system 18 in accordance with the present invention and will be described more fully hereinafter.

The image-reproducing device 15 includes a tube 19 for developing color images from electrical signals applied to the control circuits thereof. A tube of such type is more fully described in an article entitled "General Description of Receivers for the Dot-Sequential Color Television System which Employ Direct-View Tri-Color Kinescopes" in the RCA Review for June 1950, at pages 228–232, inclusive. Briefly, such a tube includes an image screen on which is arranged an orderly array of small closely spaced phosphor dots in triangular groups, each group comprising dots individually responsive to signals representative of primary colors such as green, red, and blue. Interposed between the image screen and three electron guns in the tube is an apertured mask having a plurality of holes therein individual ones of which are positioned in register with individual triangular groups of color dots on the image screen. The electron beam axes of the three guns are so aligned with the phosphor dots through the apertures of the mask that substantially only one electron beam strikes any one dot.

The color-signal detection system 14 and the generator 16 may be of types more fully described in the aforementioned article in the Proceedings of the I.R.E. Briefly, a unit such as 14 usually comprises a signal-translating channel for translating the brightness or monochrome signal having the output circuit thereof coupled to intensity control electrodes of the cathode-ray tube 19. The unit 14 also conventionally includes a signal-translating system including at least two other signal-translating channels. Each of these other channels may include, for example, an amplifier, a synchronous detector, and a low-pass filter network. One of the synchronous detectors is coupled directly to the output circuit of the generator 16, while the other of such synchronous detectors is coupled through the quadrature-phase shifter 17 to the output circuit of the generator 16, in a manner to be described more fully immediately hereinafter, for deriving signals representative of the color of the televised image from a subcarrier wave signal modulated at different phases by such representative signals. The low-pass filter networks are arranged to translate the low-frequency components of such derived signals, and the output circuits in each of the channels in the system 14 may be coupled to a matrix circuit, in a manner more fully described in the aforementioned article in the Proceedings of the I.R.E., to develop another signal representative of a color of the televised image. The output circuits of the two channels and the matrix circuit are individually coupled to different ones of three cathodes in the tube 19 for applying individual ones of the signals representative of primary colors such as green, red, and blue to the cathodes of such cathode-ray tube.

The generator 16 may be a conventional sine-wave generator for developing in the output circuit thereof a signal having the same frequency as, and at a predetermined phase with respect to, the subcarrier wave signal. The quadrature-phase shifter 17 is proportioned to shift the phase of such developed signal by 90°. A more complete consideration will be given to the units 16 and 17 when considering the frequency-difference detector system 18 hereinafter.

An output circuit of the detector 12 is coupled through a synchronizing-signal separator 20 to a line-frequency generator 21 and a field-frequency generator 22, the output circuits of the latter generators being coupled to line-frequency and field-frequency deflection windings 23 in the device 15. The separator 20 and the generator 21 are coupled through a gated color burst signal amplifier 24 and a pair of terminals 26, 26 to a pair of detectors in the frequency-difference detector system 18.

The output circuit of the translator 10 is also coupled to a conventional sound-signal reproducing apparatus 25 which may include a conventional sound-signal intermediate-frequency amplifier, a frequency detector, an audio-frequency amplifier, and a sound-signal reproducing device. The automatic-gain-control supply in the unit 12 is coupled to one or more of the input circuits of the different stages in the unit 10 in a well-known manner.

It will be understood that the antenna system 11 and the units 10, 12–17, inclusive, and 19–25, inclusive, may be of conventional construction and operation so that detailed description and explanation of the operation thereof are considered unnecessary herein.

*General explanation of operation of television receiver*

Considering briefly now the general operation of the above-described receiver as a whole, television signals intercepted by the antenna 11 are selected and amplified in the carrier-frequency translator 10 and applied to the detector 12 wherein the modulation components thereof are derived. These derived components, including synchronizing components as well as picture signals, are amplified in the video-frequency amplifier 13 and applied to the color-signal detection system 14. The picture signals comprise a composite video-frequency signal including a brightness or monochrome component and a modulated subcarrier wave signal having modulation components representative of the color of an image at predetermined phases thereof. In a manner more fully explained in the aforementioned article in the Proceedings of the I.R.E., the monochrome or brightness signal is translated through the unit 14 and applied to an intensity control electrode of the cathode-ray tube 19. Also, in a manner more fully explained in that article, the color-signal components at the predetermined phases of the modulated subcarrier wave signal, and representing for example, the green, red, and blue of the televised image, are derived in the unit 14 and individually applied to different ones of the cathodes in the tube 19. Briefly, the in-phase and quadrature signals applied by the units 16 and 17 to the synchronous detectors in the detection system 14 have such frequency and phase relations with respect to the subcarrier wave signal applied to each of the detectors in the unit 14 as to heterodyne therewith to derive from different phases thereof such signals representative of the primary colors of the image. The manner of maintaining such correspondence in frequency and phase relation between the controlled signal developed in the generator 16 and the subcarrier wave signal will be described more fully hereinafter when the frequency-difference detector system 18 is considered.

The synchronizing components, including line-frequency and field-frequency signals and a color burst signal for effecting synchronism of the operation of the generator 16 with that of a corresponding unit at a transmitter, are separated from each other and from the picture signals in the unit 20. The line-frequency and field-frequency synchronizing components are utilized to control the operation of the generators 21 and 22, respectively, and the signals developed in the output circuits of these generators are applied to the deflection windings 23 in the device 15 to cause the electron beams emitted from the cathodes of the tube 19 to trace a rectilinear pattern on the image screen of the tube 19. The intensities of the beams emitted from the cathodes of the tube 19 are individually controlled by the brightness signal applied to the grid electrode thereof and different ones of the color signals applied to different ones of the cathodes thereof. The rectilinear trace, together with the intensity control of the beams, causes the different phosphor dots to be excited to develop different colors and an image of the televised scene to be reproduced in color within the raster traced on the image screen.

The automatic-gain-control potential developed in the supply 12 is applied to the gain-control circuits of the stages in the unit 10 to maintain the signal input to the detector 12 and the apparatus 25 within a relatively narrow range for a wide range of signal intensities. The audio-frequency modulation components of a received signal are derived in a conventional manner by a sound-signal detector in the apparatus 25, amplified, and utilized to reproduce sound.

*Description of frequency-difference detector system of Fig. 1*

The frequency-difference detector system 18 of Fig. 1 comprises means for supplying a reference signal and first and second controlled signals which have substantially identical frequencies but which are in quadrature phase with respect to each other, the identical frequencies tending to differ from that of the reference signal. More specifically, such supply means includes a signal source for supplying the color burst synchronizing signal (reference signal), that is, the output circuit of the amplifier 24 coupled to the terminals 26, 26 in the unit 18 and also includes a signal-generating system for developing in-phase and quadrature-phase signals, specifically, the generator 16 and the phase shifter 17.

The frequency-difference detector system also comprises a first synchronous detector system coupled to the supply means and responsive to the reference and the first of the controlled signals for developing a resultant signal. More specifically, the first synchronous detector system includes, in cascade, in the order named, a detector 30, a quadrature-phase shifter 54, and a low-pass filter network 46 for translating signals having frequencies of less than half line frequency. The detector 30 is a conventional synchronous detector and the input circuits thereof are individually coupled to the output circuit of the amplifier 24, through a coupling condenser 31 and the pair of terminals 26, 26, and to the output circuit of the quadrature-phase shifter 17. The unit 54 is a conventional phase-shifting network proportioned to shift the phase of the beat-frequency signal translated therethrough by approximately 90° so that the signal developed in the output circuit of the network 46 is substantially in-phase or antiphase with the beat-frequency signal developed in the output circuit of a second synchronous detector 32.

The frequency-difference detector system further includes a combined synchronous detector and modulator system coupled to the supply means and to the first synchronous detector and responsive to the reference signal, the second of the controlled signals, and the resultant signal for modulating one of the pair of signals comprising the reference and the second of the controlled signals with the resultant signal to develop a modulated signal and for heterodyning the modulated signal and the other of the pair of signals to develop an output signal representative of the difference in frequency of the reference and the controlled signals. More specifically, the combined system of Fig. 1 includes the detector 32 and a modulator circuit 33. The balanced synchronous detector 32 is a unit in an automatic-phase-control (APC) system and includes a tube 34 having a pair of diodes, the cathode of one and the anode of the other diode being individually coupled through similar low-frequency load circuits 35 and 36 to opposite terminals of an inductor 37. The inductor 37 has a center tap which is connected to chassis-ground and one terminal of this inductor is coupled through a condenser 38 to the ungrounded one of the pair of terminals 26, 26. The grounding of the center tap of the inductor 37 causes the color burst signal developed on the end terminals of such inductor to be 180° out-of-phase with respect to such reference point (chassis-ground). The remaining anode and cathode of the tube 34 are connected together and to a conventional APC integrating network 50 and are also connected through a coupling condenser 39 to the anode of a multigrid tube 40 in the modulator circuit 33.

The anode of the tube 40 is coupled through a load inductor 41 to the positive terminal of a B-potential source and through a condenser 42 to a damped parallel-resonant circuit 43 broadly resonant at the frequency of the subcarrier wave signal. The first grid circuit of the tube 40 includes a grid-biasing resistor 44 and is directly connected to the output circuit of the generator 16 while the third grid circuit of this tube includes another biasing circuit 47 and is coupled through a condenser 45 to the output circuit of the filter network 46. The intermediate or second grid in the tube 40 is coupled through a current-limiting resistor 48 to the positive terminal of the B-potential source and through a by-pass condenser 49 to ground, the condenser 49 effectively shunting all signals of approximately the frequency of the subcarrier wave signal. In the embodiment of Fig. 1, the circuit including the tube 40 comprises a conventional modulator circuit in which the second controlled signal applied to the first grid of such tube by the generator 16 is modulated by the resultant signal applied to the third grid of this tube from the output circuit of the filter network 46. The output circuit of the modulator, specifically, the anode circuit thereof is coupled through the coupling condenser 39 to an input circuit of the second synchronous detector 32.

The frequency-difference detector system also includes means for applying the output signal of the combined synchronous detector and modulator system to a utilizing means. More specifically, the embodiment of Fig. 1 includes a reactance circuit 55 coupled between the output circuit of the APC filter network 50 and the color wave-signal generator 16 for utilizing the output signal developed in the network 50 to control the phase of the signal developed in the generator 16.

*Explanation of operation of frequency-difference detector system of Fig. 1*

As described more fully in applicant's copending application Serial No. 328,917, the channel including the tube 34, the APC filter network 50, and the reactance circuit 55 comprises a conventional APC system for a television receiver. Under normal operating conditions when the generator 16 is synchronous with the subcarrier wave signal, such channel is adequate to maintain the synchronous operation. To supplement the control of the normal APC system and provide more noise-immune and stable operation of such system, the auxiliary channel including the synchronous detector 30 and the units 46 and 54 are included to develop an auxiliary control signal which, as described in the copending application just referred to, is combined with the control signal developed in the conventional APC system to provide improved synchronizing in the receiver.

The additional benefits to be obtained by employing the modulator 33 in combination with the conventional APC system and the auxiliary control circuit will now be described with reference to the curves of Figs. 2 and 3. In considering such curves, it should be remembered that, though for simplicity of representation the curves representing the color burst signal are indicated as continuous, in practice only bursts of eight or ten cycles of such signal occur during each synchronizing period. However, the results obtained are substantially the same whether such color-synchronizing signal is translated in bursts or continuously. Referring first to the curves of Fig. 2, these curves are valid only if it is initially assumed that the circuit including the tube 40 is a simple amplifier and that no resultant signal is being developed in the output circuit of the filter network 46. The color burst signal, such as represented by curve A of Fig. 2, is applied from the output circuit of the amplifier 24 through the pair of terminals 26, 26 and the condenser 38 to the inductor 37. In the inductor 37, a pair of such burst signals with a 180° phase relation are developed in the end terminals thereof and individually applied through the circuits 35 and 36 to an anode and a cathode of the tube 34. The controlled signal developed in the color wave-signal generator 16 and represented by curve B of Fig. 2 is applied through the tube 40 to the interconnected anode and cathode of the tube 34. In practice, one of the signals represented by curves A and B has a greater magnitude than the other so that there will be no overmodulation of the larger signal by the beat-frequency signal. It is a matter of choice as to which of the signals should be large or small though it is desirable that the signal of greater magnitude be applied through the networks 35 and 36.

Lack of synchronism of the locally generated signal (generator 16) with respect to the burst signals applied to the tube 40 would cause a pair of composite beat signals such as represented by curves C and D individually to be developed between the anodes and cathodes of the two diodes of the tube 34. Due to the back-to-back relation of the diodes in the tube 34, their peak-detection action, and the low-frequency characteristics of the load circuits 35 and 36, the positive envelope of one and the negative envelope of the other of such modulated signals are effectively derived at an anode and a cathode of such tube 34, these envelope signals being represented by curves $E_1$ and $E_2$ of Fig. 2. The interconnection of the anode and cathode in the output circuit of the tube 34 causes the signals represented by curves $E_1$ and $E_2$ to be combined into a signal represented by curve F. As is conventional in APC systems, the control being continuously effected on the frequency of the local generator causes a shift in the phasing of the signals represented by curves A and B over a cycle of the signal represented by curve F, thereby causing the latter signal to be asymmetrical. The APC filter network 50 integrates the signal represented by curve F to develop a slightly positive control potential, such as represented by the axis G of Fig. 2. The nature and degree of the asymmetry of the signal represented by curve F determine the sense and magnitude of this control potential and such potential will vary in sense and magnitude depending upon the frequency difference of the controlled and color burst signals. The control potential is applied to the reactance circuit 55 to control the operation of the generator 16 in frequency so as to cause the controlled signal and the color burst signal to be in synchronism.

One of the deficiencies of an APC system of the type just described is indicated by curves $A_1$, $A_2$ of Fig. 4. These curves represent the control potentials developed in the output circuit of the APC phase detector for instantaneous frequency differences between the color burst and control signals if the APC loop circuit is open at the reactance tube for unidirectional currents so no unidirectional control potential is applied to the generator of the controlled signals. It is noted that, as the frequency difference increases, the magnitude of the control potential decreases, thus tending to be least effective at extreme frequency differences, when it should be most effective. To eliminate this deficiency, another control signal, such as represented by curve B of Fig. 4, is developed in an auxiliary control system, in a manner to be explained more fully hereinafter, specifically, as a modulation signal of either the color burst or controlled signals applied to the phase detector. This auxiliary control signal effectively combines with that represented by curve $A_1$ for example, substantially to provide an effective control potential such as represented by curve C of Fig. 4. The manner in which such auxiliary control potential is developed and the two control potentials are effectively combined is more fully understood by considering the curves of Fig. 3.

Curve A of Fig. 3 represents, in continuous-wave form, the color burst signal applied to the pair of terminals 26, 26 and, therefore, corresponds with curve A of Fig. 2. At the time such color burst signal is applied to the diode 34, due to the existence of any frequency difference between it and the controlled signal, there is developed in the output circuit of the network 46 a control or resultant signal similar to the signal represented by curve F of Fig. 2. This resultant signal is applied through the condenser 45 to the third grid of the multi-electrode tube 40. As described with reference to Fig. 2, at the time such resultant signal is applied to the third grid of the tube 40, a controlled signal, such as represented by curve B of Fig. 2 and which is developed in the generator 16, is applied to the first grid of such tube. In the tube 40, the signal represented by curve B of Fig. 2 is modulated by the signal developed in the output circuit of the unit 46 to develop, in the output circuit of such tube, a modulated signal such as represented by curve B of Fig. 3. The signals represented by curves A and B of Fig. 3 effectively heterodyne in the two diode circuits of the tube 34 and cause signals such as represented by curves C and D of Fig. 3 to be developed between the anodes and cathodes of the diodes. It is obvious that the pairs of curves C and D of Figs. 2 and 3 differ. This difference is caused by the modulation component of the signal represented by curve B of Fig. 3. The manner in which this difference is effected will now be described in more detail.

The increase in magnitude of the signal represented by curve B during the first half cycle of the modulation component thereof causes the modulation effect of the beating of the signals represented by curves A and B of Fig. 3 to be increased in magnitude. This results in an enhanced increase in the magnitude of the signal represented by curve C during this half cycle and an enhanced decrease in the magnitude of the signal represented by curve D luring the same period. For the same reason, the decrease in magnitude of the signal represented by curve B during the next half cycle of the modulation component thereof causes a reduction in the modulation effect of the beating of the signals represented by curves A and B of Fig. 3, resulting in corresponding effects on the signals represented by curves C and D of Fig. 3. As a result, the envelopes of the signals represented by curves C and D become very asymmetrical. Due to this asymmetry, the derived signals represented by curves $E_1$ and $E_2$ of Fig. 3 are also asymmetrical resulting in the axis of the signal represented by curve $E_1$ of Fig. 3 becoming more positive than the axis of the signal represented by curve $E_1$ of Fig. 2. This positive displacement is indicated by the relative positions of the dashed line and solid line with respect to curve $E_1$ of Fig. 3. Similarly, the axis of the signal represented by curve $E_2$ of Fig. 3 becomes less negative, and hence effectively more positive, than that of the corresponding signal represented by curve $E_2$ of Fig. 2. As a result of the displacement of both of the axes of the signals represented by curves $E_1$ and $E_2$ of Fig. 3 in a positive direction, the axis G of the composite signal represented by curve F of Fig. 3 is materially displaced in a positive direction and, thus, the magnitude of the control potential developed in the network 50 and applied to the reactance circuit 55 is materially increased in such sense as to cause the signal developed in the generator 16 to be rapidly brought into synchronism with the color burst signal. The degree of increase in the magnitude of the control potential represented by axis G increases as the controlled and color burst signals approach extreme frequency-difference conditions, as represented by curve C of Fig. 4, and thus, a desired control potential is obtained.

To summarize the operation of the frequency-difference detector 18 of Fig. 1, the synchronous detector 32 and the APC filter network 50 operate in a conventional manner under normal synchronous conditions to develop a control potential which is applied to the reactance circuit 55 to control the phase of the signal developed by the generator 16 with respect to that of a color burst synchronizing signal. If for any reason the signal developed in the generator 16 is or tends to have such frequency relation with respect to the color bust signal as effectively to cause the color-signal deriving apparatus in the television receiver to be asynchronous, then an additional control potential is developed in the output circuit of the filter network 46 and applied to an input circuit of the modulator 33. In the modulator 33 such additional control potential modulates the signal developed in the generator 16 with the result that, as such modulated signal is heterodyned with the color burst synchronizing signal in the synchronous detector 32, a control potential of increased magnitude is developed and applied through the reactance circuit 55 to the generator 16 rapidly to cause such generator to be brought into synchronous operation.

*Description and explanation of operation of frequency-difference detector system of Fig. 5*

In the embodiment of Fig. 1 there has been described a modulator in which a signal developed in a color wave-signal generator is modulated by a resultant signal developed in an auxiliary channel for developing signals representative of the phase conditions of a color burst synchronizing signal and a locally generated or controlled signal. Instead of modulating the locally generated signal with such resultant signal, it may be desirable to effect a similar modulation of the color burst signal. The embodiment of Fig. 5 represents a frequency-difference detector system in which such modulation is effected.

Except for the coupling of the modulator and the rearrangement of the detector 32 in the embodiment of Fig. 5, this embodiment is the same as that of Fig. 1 and, threfore, corresponding units are identified by the same reference numerals.

In the embodiment of Fig. 5, the modulator 60, which may have a structure similar to that of the modulator 33 of Fig. 1, is coupled between the pair of input terminals 26, 26 and the input circuits of the synchronous detector 32. Additionally, the signal developed in the output circuit of the color wave-signal generator 16 is larger in magnitude than that of the color burst signal and is directly coupled to an input circuit of the synchronous detector 32, the detector 32 being rearranged so that the signal from the generator 16 is applied to the tube 34 through the networks 35 and 36. Except for the fact that in Fig. 5 the color burst synchronizing signal is the one that is modulated by the resultant signal developed in the output circuit of the filter network 46, the embodiment of Fig. 5 operates in the same manner as that described with reference to the embodiment of Fig. 1 and, therefore, no more detailed explanation of the operation thereof is considered necessary.

*Description and explanation of operation of embodiment of Fig. 6*

In considering the details of operation of the embodiment of Fig. 1, it is noted that a first modulation occurs in the modulator 33 and a second heterodyning operation of the modulated signal developed in the unit 33 with the color burst signal occurs in the synchronous detector 32. To simplify the operation of such a frequency-difference detector system and to reduce the number of circuit elements employed to effect the beneficial results of such system, it may be desirable to combine these two modulation operations, or corresponding such operations as occur in the embodiment of Fig. 5, in one modulator. The embodiment of Fig. 6 includes such a modulator.

Except for the combination in the embodiment of Fig. 6 of one of the synchronous detectors and the modulator into a unit including one tube, the embodiments of Figs. 1 and 6 are generally similar and, therefore, corresponding units are identified by the same reference numerals.

In the embodiment of Fig. 6, a combined synchronous detector and modulator 70 including a multielectrode tube 72 is coupled between the pair of input terminals 26, 26 and the APC filter network 50. The ungrounded one of the pair of terminals 26, 26 is coupled through a condenser 71 to the third electrode of the tube 72, this electrode circuit including a biasing resistor 73 coupled to the cathode. The cathode of this tube is coupled to a source of −B potential which is below chassis-ground potential and the second grid thereof is connected to chassis-ground. The first grid of the tube 72 is coupled through an isolating resistor 77 and the condenser 45 to the output circuit of the filter network 46 and, additionally, coupled through a condenser 78 to the output circuit of the generator 16. The first grid circuit also includes a biasing circuit 79 coupled between the first grid and the cathode. The anode of the tube 72 is connected to a tap on a voltage divider 80 and to the APC filter network 50. The divider 80 is coupled across the B-potential source and has a further tap between that to the anode of the tube 72 and the −B terminal which is connected to ground. The potential on the anode is substantially zero or ground potential.

Except that the synchronous detector portion of the unit 70 is an unbalanced detector, the unit 70 operates in a manner similar to the units 32 and 60 of Fig. 5. That is, the resultant signal developed in the output circuit of the network 46 is applied through the condenser 45 and the resistor 77 to the first grid circuit of the tube 72 to effect modulation of the color burst signal applied through the condenser 71 to the third grid circuit of such tube. Additionally, the signal developed in the generator 16 is applied through the coupling condenser 78 to the first grid of the tube 72 also to effect modulation of the color burst signal in the third grid circuit thereof. As a result, the signal developed in the output circuit of the tube 72 is modulated not only by the conventional heterodyning of the color burst signal and the signal developed in the generator 16 but also by the resultant signal developed in the output circuit of the network 46. Thus, the aforementioned benefits, considered when explaining the curves of Figs. 2, 3, and 4, except for the diminishing of the magnitude of the control potential due to the fact that an unbalanced synchronous detector is utilized in the unit 70 of Fig. 6, are also obtainable in the frequency-difference detector system of Fig. 6. These benefits are obtained by employing only a few circuit elements additional to those that would be required in a frequency-difference detector system employing two synchronous detector channels for developing dual control signals.

Though there have been described herein specific modulator circuits and synchronous detector circuits utilizing specific reference and controlled signals, it will be understood that the present invention is applicable to develop a signal indicative of frequency difference where the difference between any two signals is to be ascertained. Therefore, though specific circuits and signals have been described herein, it is to be understood that the invention is not to be limited thereto.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A frequency-difference detector system comprising: supply means for supplying a reference signal; a signal-generating system for developing first and second controlled signals which have substantially identical frequencies but are in quadrature phase with respect to each other, said identical frequencies tending to differ from that of said reference signal; a first synchronous detector system coupled to said supply means and said signal-generating system and responsive to said reference and said first of said controlled signals for developing a resultant signal; a combined synchronous detector and modulator system coupled to said supply means, said signal-generating system, and said first synchronous detector and responsive to said reference signal, the second of said controlled signals, and said resultant signal for modulating one of the pair of signals comprising said reference and the second of said controlled signals with said resultant signal to develop a modulated signal and for heterodyning said modulated signal and the other of said pair of signals to develop an output signal representative of the difference in frequency of said reference and said controlled signals; and means for applying said output signal to said generating system for synchronizing said controlled signals with said reference signal.

2. In a color-synchronizing system for a color-television receiver, a frequency-difference detector system comprising: means for supplying a color burst synchronizing signal; a color wave-signal generating system for developing first and second controlled signals which have substantially identical frequencies but are in quadrature phase with respect to each other, said identical frequencies tending to differ from that of said reference signal; a first synchronous detector system coupled to said supply means and said generating system and responsive to said color burst and said first of said controlled signals for developing a resultant signal; a combined synchronous detector and modulator system coupled to said supply means, said generating system and said first synchronous detector and responsive to said color burst signal, the second of said controlled signals, and said resultant signal for modulating one of the pair of signals comprising said color burst and the second of said controlled signals with said resultant signal to develop a modulated signal and for heterodyning said modulated signal and the other of said pair of signals to develop an output signal representative of the difference in frequency of said color burst and said controlled signals; and a reactance circuit for applying said output signal to said generating system for synchronizing said controlled signals with said color burst signal.

3. In a color-synchronizing system for a color-television receiver, a frequency-difference detector system comprising: means for supplying a color burst synchronizing signal and first and second controlled signals which have substantially identical frequencies but are in quadrature phase with respect to each other, said identical frequencies tending to differ from that of said color burst signal; a first synchronous detector system coupled to said supply means and responsive to said color burst and said first of said controlled signals for developing a resultant signal; a modulator coupled to said first synchronous detector system and said supply means and responsive to said resultant signal and one of the pair of signals comprising said color burst and the second of said controlled signals for developing a modulated signal; a second synchronous detector system coupled to said supply means and said modulator and responsive to said modulated signal and the other one of said pair of signals for developing an output signal representative of the difference in frequency of said color burst and said controlled signals; and means for applying said output signal to said supply means for synchronizing said controlled signals with said color burst signal.

4. In a color-synchronizing system for a color-television receiver, a frequency-difference detector system comprising: means for supplying a color burst synchronizing signal; a color wave-signal generating system for developing first and second controlled signals which have substantially identical frequencies but are in quadrature phase with respect to each other, said identical frequencies tending to differ from that of said color burst signal; a first synchronous detector system coupled to said supply means and said generating system and responsive to said color burst and said first of said controlled signals for developing a resultant signal; a modulator coupled to said first synchronous detector system and said generating system and responsive to said resultant signal and said second of said controlled signals for developing a modulated signal; a second synchronous detector system coupled to said supply means and said modulator and responsive to said modulated signal and said color burst signal for developing an output signal representative of the difference in frequency of said color burst and said controlled signals; and means for applying said output signal to said generating system for synchronizing said controlled signals with said color burst signal.

5. In a color-synchronizing system for a color-television receiver, a frequency-difference detector system comprising: means for supplying a color burst synchronizing signal; a color wave-signal generating system for developing first and second controlled signals which have substantially identical frequencies but are in quadrature phase with respect to each other, said identical frequencies tending to differ from that of said color burst signal; a first synchronous detector system coupled to said supply means and said generating system and responsive to siad color burst and said first of said controlled signals for developing a resultant signal; a modulator coupled to said first synchronous detector system and said supply means and responsive to said resultant and said color burst signals for developing a modulated signal; a second synchronous detector system coupled to said generating system and said modulator and responsive to said modulated signal and said second of said controlled signals for developing an output signal representative of the difference in frequency of said color burst and said controlled signals; and means for applying said output signal to said generating system for synchronizing said controlled signals with said color burst signal.

6. In a color-synchronizing system for a color-television receiver, a frequency-difference detector system comprising: means for supplying a color burst synchronizing signal and first and second controlled signals which have substantially identical frequencies but are in quadrature phase with respect to each other, said identical frequencies tending to differ from that of said color burst signal; a first syncronous detector system coupled to said supply means and responsive to said color burst and said first of said controlled signals for developing a resultant signal; a modulator coupled to said first synchronous detector system and said supply means and responsive to said resultant signal and one of the pair of signals comprising said color burst and the second of said controlled signals for developing a modulated signal; an automatic-phase-control system coupled to said supply means and said modulator and responsive to said modulated signal and the other one of said pair of signals for developing an output signal representative of the difference in frequency of said color burst and said controlled signals; and means for applying said output signal to said supply means for synchronizing said controlled signals with said color burst signal.

7. In a color-synchronizing system for a color-television receiver, a frequency-difference detector system comprising: means for supplying a color burst synchronizing signal and first and second controlled signals which have substantially identical frequencies but are in quadrature phase with respect to each other, said identical frequencies tending to differ from that of said color burst signal; a first synchronous detector system coupled to said supply means and responsive to said color burst and said first of said controlled signals for developing a resultant signal; a modulator coupled to said first synchronous detector system and said supply means and responsive to said resultant signal and one of the pair of signals comprising said color burst and the second of said controlled signals for developing a modulated signal; a second synchronous detector system coupled to said supply means and said modulator and responsive to said modulated signal and the other one of said pair of signals for developing an output signal representative of the difference in frequency of said color burst and said controlled signals; and a reactance circuit for applying said output signal to said supply means for synchronizing said controlled signals with said color burst signal.

8. In a color-synchronizing system for a color-television receiver, a frequency-difference detector system comprising: means for supplying a color burst synchronizing signal; a color wave-signal generating system for developing first and second controlled signals which have substantially identical frequencies but are in quadrature phase with respect to each other, said identical frequencies tending to differ from that of said color burst signal; a first synchronous detector system coupled to said supply means and said generating system and responsive to said color burst and said first of said controlled signals for developing a resultant signal; a modulator coupled to said first synchronous detector system and said generating system and responsive to said resultant signal and said second of said controlled signals for developing a modulated signal; an automatic-phase-control system coupled to said supply means and said modulator and responsive to said modulated signal and said color burst signal for developing an output signal representative of the difference in frequency of said color burst and said controlled signals; and a reactance circuit for applying said output signal to said generating system for synchronizing said controlled signals with said color burst signal.

9. A synchronizing system comprising: means for supplying a synchronizing signal; means including a generator for generating controlled signals desirably in synchronism; means including an automatic-phase control ing signal but which may be undesirably out-of-synchronism; means including an automatic-phase control system having an integrating network for beating said controlled signals and said synchronizing signal to produce in said network a unidirectional control effect on said generator tending to bring said controlled signals into synchronism at a desired phase relation with said synchronizing signal; means including an auxiliary control system including a synchronous detector for beating said controlled signals and said synchronizing signal for developing a beat-frequency resultant signal representative of the difference in frequency between said synchronizing and controlled signals; and circuit means for applying said resultant signal to modulate the signals in said automatic-phase-control system for modifying said control effect when said synchronizing and controlled signals differ in frequency.

10. A synchronizing system comprising: means for supplying a synchronizing signal; means including a generator for generating controlled signals desirably in synchronism at a desired phase relation with said synchronizing signal but which may be undesirably out-of-synchronism; means including an automatic-phase-control system having an integrating network for beating said controlled signals and said synchronizing signal to produce in said network a unidirectional control effect on said generator tending to bring said controlled signals into synchronism at a desired phase relation with said synchronizing signal; means including an auxiliary control system including a synchronous detector for beating said controlled signals and said synchronizing signal for developing a beat-frequency resultant signal representative of the difference in frequency between said synchronizing and controlled signals; and circuit means for applying said resultant signal to modulate the signals in said automatic-phase-control system for increasing said control effect when said synchronizing and controlled signals differ in frequency.

11. A synchronizing system comprising: means for supplying a synchronizing signal; means including a generator for generating controlled signals desirably in synchronism at a desired phase relation with said synchronizing signal but which may be undesirably out-of-synchronism; means including an automatic-phase-control system having an integrating network for beating said controlled signals and said synchronizing signal to produce in said network a unidirectional control effect on said generator tending to bring said controlled signals into synchronism at a desired phase relation with said synchronizing signal; means including an auxiliary control system including a synchronous detector for beating said controlled signals and said synchronizing signal at a phase relation differing from that in said automatic-phase-control system for developing a beat-frequency resultant signal representative of the difference in frequency between said synchronizing and controlled signals; and circuit means for applying said resultant signal to modulate the signals in said automatic-phase-control system for increasing said control effect when said synchronizing and controlled signals differ in frequency.

12. A synchronizing system for a television receiver comprising: means for supplying television signals including a synchronizing signal; means including a generator for generating controlled signals desirably in synchronism at a desired phase relation with said synchronizing signal but which may be undesirably out-of-synchronism; means including an automatic-phase-control system having an integrating network for beating said controlled signals and said synchronizing signal to produce in said network a unidirectional control effect on said generator tending to bring said controlled signals into synchronism at a desired phase relation with said synchronizing signal; means including an auxiliary control system including a synchronous detector for beating said controlled signals and said synchronizing signal for developing a beat-frequency resultant signal representative of the difference in frequency between said synchronizing and controlled signals; and circuit means for applying said resultant signal to modulate the signals in said automatic-phase-control system for increasing said control effect when said synchronizing and controlled signals differ in frequency.

13. A synchronizing system for a television receiver comprising: means for supplying television signals including a synchronizing signal; means including a generator for generating controlled signals desirably in synchronism at a desired phase relation with said synchronizing signal but which may be undesirably out-of-synchronism; means including an automatic-phase-control system having an integrating network for beating said controlled signals and said synchronizing signal to produce in said network a unidirectional control effect on said generator tending to bring said controlled signals into synchronism at a desired phase relation with said synchronizing signal; means including an auxiliary control system including a synchronous detector for beating said controlled signals and said synchronizing signal at a phase relation differing from that in said automatic-phase-control system for developing a beat-frequency resultant signal representative of the difference in frequency between said synchronizing and controlled signals; and circuit means for applying said resultant signal to modulate the signals in said automatic-phase-control system for increasing said control effect when said synchronizing and controlled signals differ in frequency.

14. A synchronizing system for a color-television receiver comprising: means for supplying color-television signals including repetitive color synchronizing signals; means including a color reference generator for generating controlled color reference signals desirably in synchronism at a desired phase relation with said synchronizing signal but which may be undesirably out-of-synchronism; means including an automatic-phase-control system having an integrating network for beating said controlled signals and said synchronizing signals to produce in said network a unidirectional control effect on said generator tending to bring said controlled signals into synchronism at a desired phase relation with said synchronizing signals; means including an auxiliary control system including a synchronous detector for beating said controlled signals and said synchronizing signals for developing a beat-frequency resultant signal representative of the difference in frequency between said synchronizing and controlled signals; and circuit means for applying said resultant signal to modulate the signals in said automatic-phase-control system for increasing said control effect when said synchronizing and controlled signals differ in frequency.

References Cited in the file of this patent

UNITED STATES PATENTS

| | | |
|---|---|---|
| 2,274,434 | Sheaffer | Feb. 24, 1942 |
| 2,380,947 | Crosby | Aug. 7, 1945 |
| 2,594,380 | Barton | Apr. 29, 1952 |
| 2,645,678 | Christensen | July 14, 1953 |
| 2,653,187 | Luck | Sept. 12, 1953 |